(12) United States Patent
Kornegay

(10) Patent No.: US 8,303,175 B2
(45) Date of Patent: Nov. 6, 2012

(54) TEMPERATURE CABINET SUPPORT STRUCTURE

(75) Inventor: Brandon Kornegay, New Bern, NC (US)

(73) Assignee: BSH Home Appliances Corporation, Irvine, CA (US)

( * ) Notice: Subject to any disclaimer, the term of this patent is extended or adjusted under 35 U.S.C. 154(b) by 318 days.

(21) Appl. No.: 12/825,431

(22) Filed: Jun. 29, 2010

(65) Prior Publication Data

US 2011/0317738 A1 Dec. 29, 2011

(51) Int. Cl.
*G01K 1/14* (2006.01)
*G01K 1/08* (2006.01)
*G01K 13/00* (2006.01)

(52) U.S. Cl. ...................................................... 374/149
(58) Field of Classification Search .................. 374/149; 700/275
See application file for complete search history.

(56) References Cited

U.S. PATENT DOCUMENTS

| | | | | |
|---|---|---|---|---|
| 4,668,029 A | * | 5/1987 | Maizlish et al. | 312/351.13 |
| 5,083,845 A | * | 1/1992 | Sparks et al. | 312/228 |
| 7,040,115 B1 | | 5/2006 | Lopez et al. | |
| 7,703,389 B2 | * | 4/2010 | McLemore et al. | 99/413 |
| 2005/0263970 A1 | | 12/2005 | Foster-Hentz | |
| 2009/0315436 A1 | * | 12/2009 | Robinson et al. | 312/249.11 |

\* cited by examiner

*Primary Examiner* — Lisa Caputo
*Assistant Examiner* — Jamel Williams
(74) *Attorney, Agent, or Firm* — James E. Howard; Andre Pallapies

(57) ABSTRACT

A framework is provided for positioning a testing cabinet for testing an appliance. The framework includes a base for supporting the appliance; a first side frame attached to the base; a rear frame attached to the base; a second side frame attached to the base and located opposite to the first side frame; and a top frame attached to the first side frame. The first side frame, the rear frame, the second side frame, and the top frame are adapted to hold panels of the testing cabinet in a predetermined position relative to the appliance, and the framework is adapted to hold a side panel of the panels of the testing cabinet in a plurality of different positions.

16 Claims, 5 Drawing Sheets

TEMPERATURE CABINET SUPPORT STRUCTURE

FIELD OF THE INVENTION

The invention is directed to a framework for positioning an adjustable testing cabinet for testing an appliance, and, more particularly, to a framework for positioning an adjustable temperature cabinet for testing the heat transferred from a cooking appliance.

BACKGROUND OF THE INVENTION

Many appliances, such as, for example, built-in ovens, need to be tested for conformance to design criteria and/or government or industry standards. In the case of built-in ovens, testing is required to confirm that a furniture recess in which the oven will be installed will be subjected to only a certain temperature while the oven is in use.

This testing can be performed by building a cabinet around the oven being tested and including temperature sensors in the panels of the cabinet. The oven is then operated at a predetermined temperature or temperatures for a predetermined period of time. Repeatability of the testing procedure is important to ensure consistent data and conformance with government and/or industry standards.

Currently, the test cabinet is assembled around the oven, the test is run, and then the cabinet is disassembled. The cabinet is predominantly made of wood and held together by screws. The assembly and disassembly process is time consuming and great care needs to be taken to reassemble the cabinet in exactly the same manner each time. Also, over time, the panels of the cabinet deteriorate where the screws are located as a result of repeated assembly and disassembly.

The current process is further complicated by the fact that ovens come in several widths. Different top and rear panels are needed to build the cabinet to the correct dimensions for each of the widths.

SUMMARY

The invention recognizes that it is desirable to provide a test cabinet system that provides precise repeatability, dimensional stability, easy and quick assembly and disassembly, and adjustability. These properties are provided by a framework and apparatus of the invention.

Exemplary embodiments of the invention provide a framework for positioning a test cabinet that is used to test appliances. Other embodiments provide a framework and a test cabinet that are used to test appliances.

Particular embodiments of the invention are directed to a framework for positioning a testing cabinet for testing an appliance. The framework includes a base for supporting the appliance; a first side frame attached to the base; a rear frame attached to the base; a second side frame attached to the base and located opposite to the first side frame; and a top frame attached to the first side frame. The first side frame, the rear frame, the second side frame, and the top frame are adapted to hold panels of the testing cabinet in a predetermined position relative to the appliance, and the framework is adapted to hold a side panel of the panels of the testing cabinet in a plurality of different positions.

Other embodiments of the invention are directed to an apparatus for testing an appliance. The apparatus includes a base for supporting the appliance; a first side frame attached to the base; a rear frame attached to the base; a second side frame attached to the base and located opposite to the first side frame; a top frame attached to the first side frame; a first side panel attached to the first side frame; a rear panel attached to the rear frame; a top panel attached to the top frame; and a second side panel positioned opposite to the first side panel. The second side panel is positionable in a plurality of different positions, and the panels form a cabinet that enclose a space for receiving the appliance.

The invention has proven to reduce the amount of labor and time needed to set up a test piece for testing, for removal of the first test piece, and for the subsequent set up of a second test piece. The invention has also reduced the cost of materials needed for testing by greatly increasing the longevity of the wooden panels used in the test cabinet.

BRIEF DESCRIPTION OF THE DRAWINGS

The following figures form part of the present specification and are included to further demonstrate certain aspects of the disclosed features and functions, and should not be used to limit or define the disclosed features and functions. Consequently, a more complete understanding of the exemplary embodiments and further features and advantages thereof may be acquired by referring to the following description taken in conjunction with the accompanying drawings, wherein.

DETAILED DESCRIPTION

The invention is described herein with reference to the accompanying drawings in which exemplary embodiments of the invention are shown. The invention may, however, be embodied in many different forms and should not be construed as limited to the embodiments set forth herein.

Figure 1:
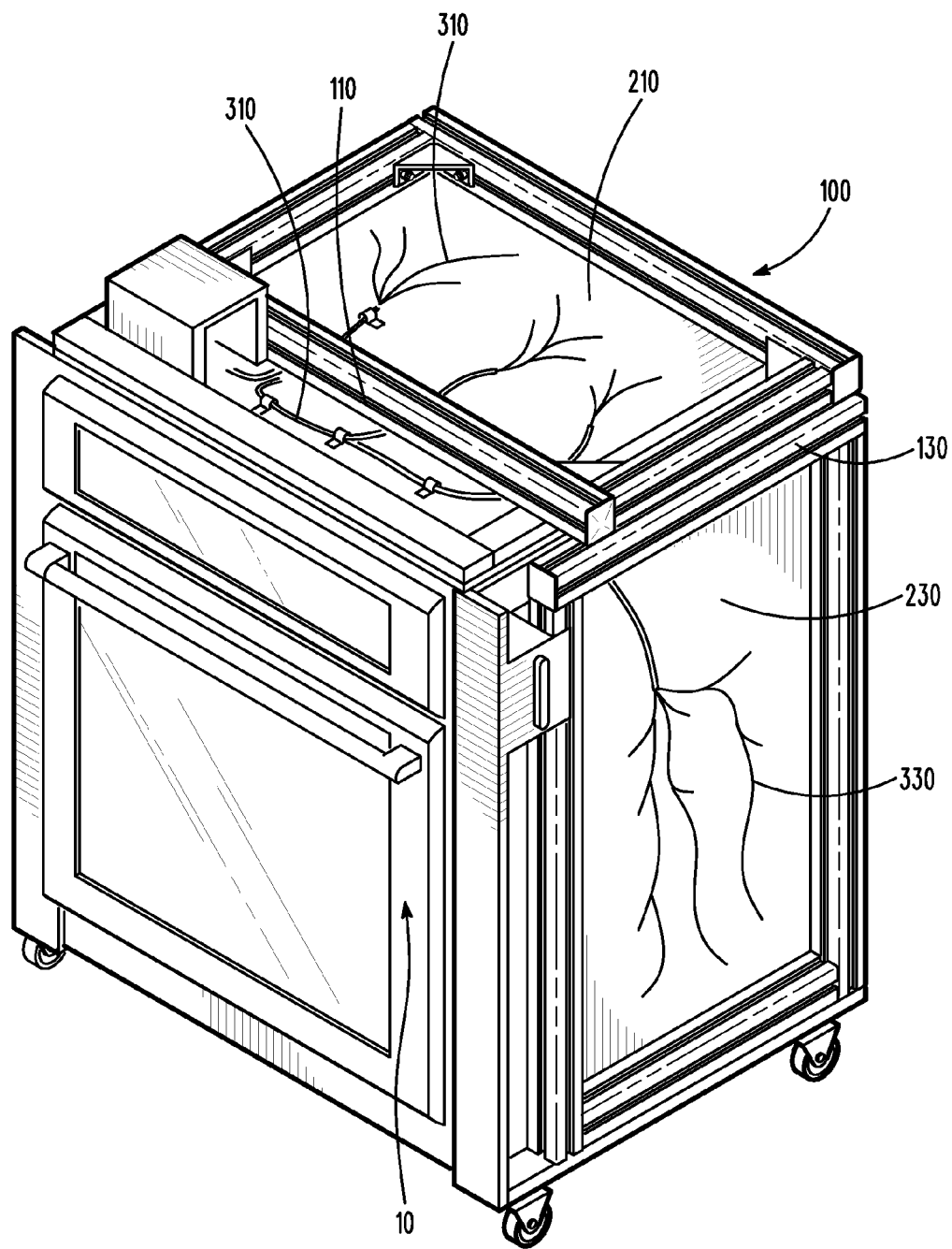
FIG. 1 is a perspective view of a first exemplary embodiment of the invention.

FIG. 1 shows an example of an embodiment of the invention being used to test a test piece 10 (in this case an oven) to measure heat transfer from the oven to a surrounding cabinet. A support structure 100 includes a plurality of metal frames that hold a plurality of cabinet panels in predetermined positions relative to test piece 10. In this example, support structure 100 has a top frame 110, a left frame (not shown in this figure), a right frame 130, and a rear frame (not shown in this figure). A cabinet top 210 is attached to top frame 110, a left cabinet wall (not shown in this figure) is attached to the left frame, and a rear cabinet wall is attached to the rear frame. The left frame, right frame 130, and the rear frame are attached to a base. In this example, right cabinet wall 230 may be attached to right frame 130, or it may be attached only to the rear cabinet wall and/or the rear frame and/or the base. In addition, in this example, the left frame and right frame 130 are attached to the rear frame creating a rigid support structure for the cabinet panels.

In this example, some or all of the cabinet panels may have sensors (for example, temperature sensors) mounted to them to sense a condition (for example, temperature) inside the enclosure created by the cabinet panels. FIG. 1 shows top cabinet sensor wires 310 mounted to cabinet top 210 and right cabinet sensor wires 330 mounted to right cabinet wall 230. The left cabinet wall and the rear cabinet wall also have sensors and sensor wires, but they are not shown in FIG. 1. In addition, the base of the cabinet can also have sensors and sensor wires. The sensor wires connect the sensors to a control/monitoring unit that collects the sensor data.

Figure 2:
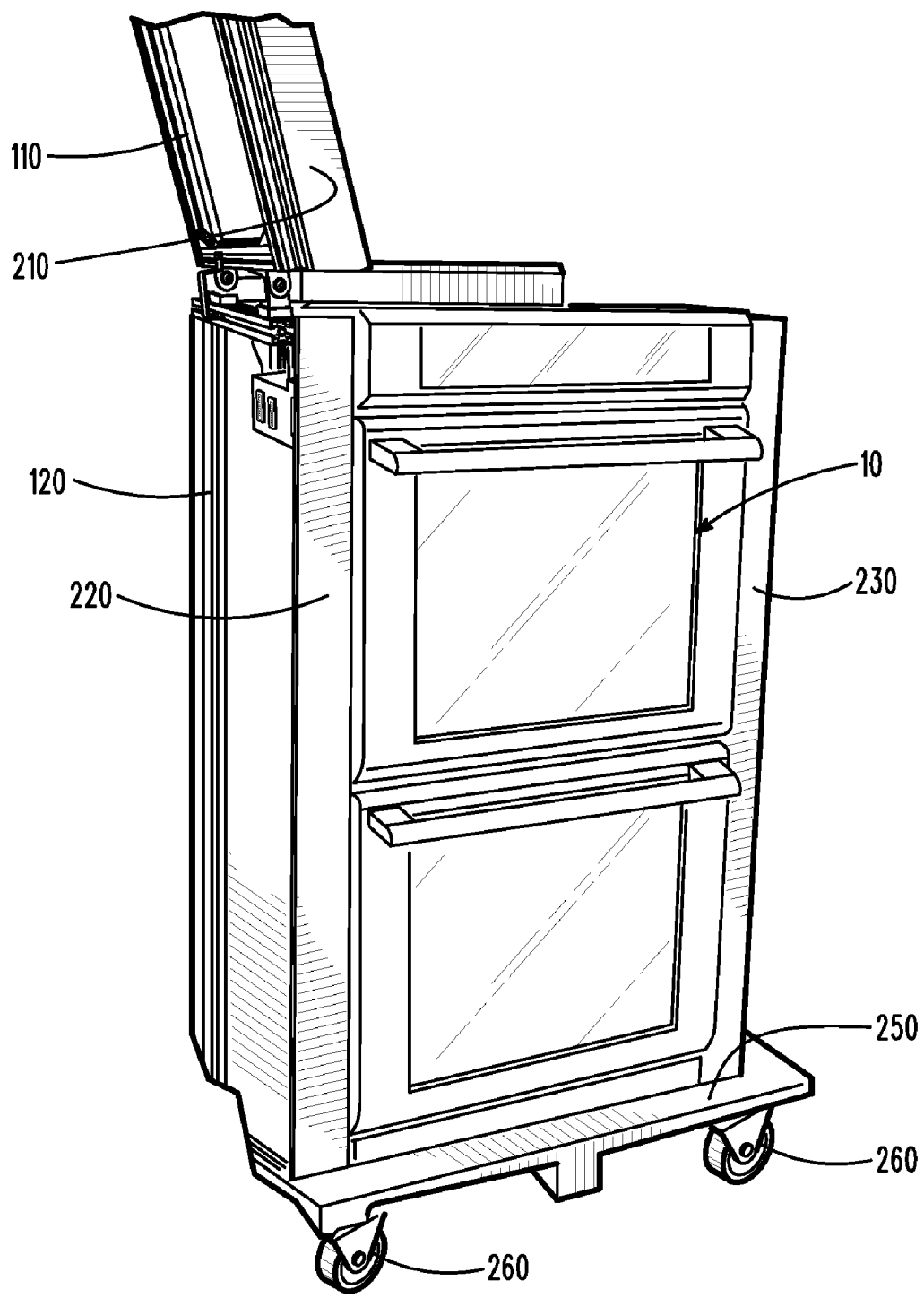
FIG. 2 is a perspective view of a second exemplary embodiment of the invention.

The example shown in FIG. 1 is an embodiment for testing a single oven. FIG. 2 shows an embodiment of the invention for testing a double oven. FIG. 2 shows a left cabinet wall 220 attached to a left frame 120, and a base 250 mounted on casters 260. The operation of the embodiment shown in FIG. 2 is the same as the operation of the embodiment shown in FIG. 1.

Figure 3:
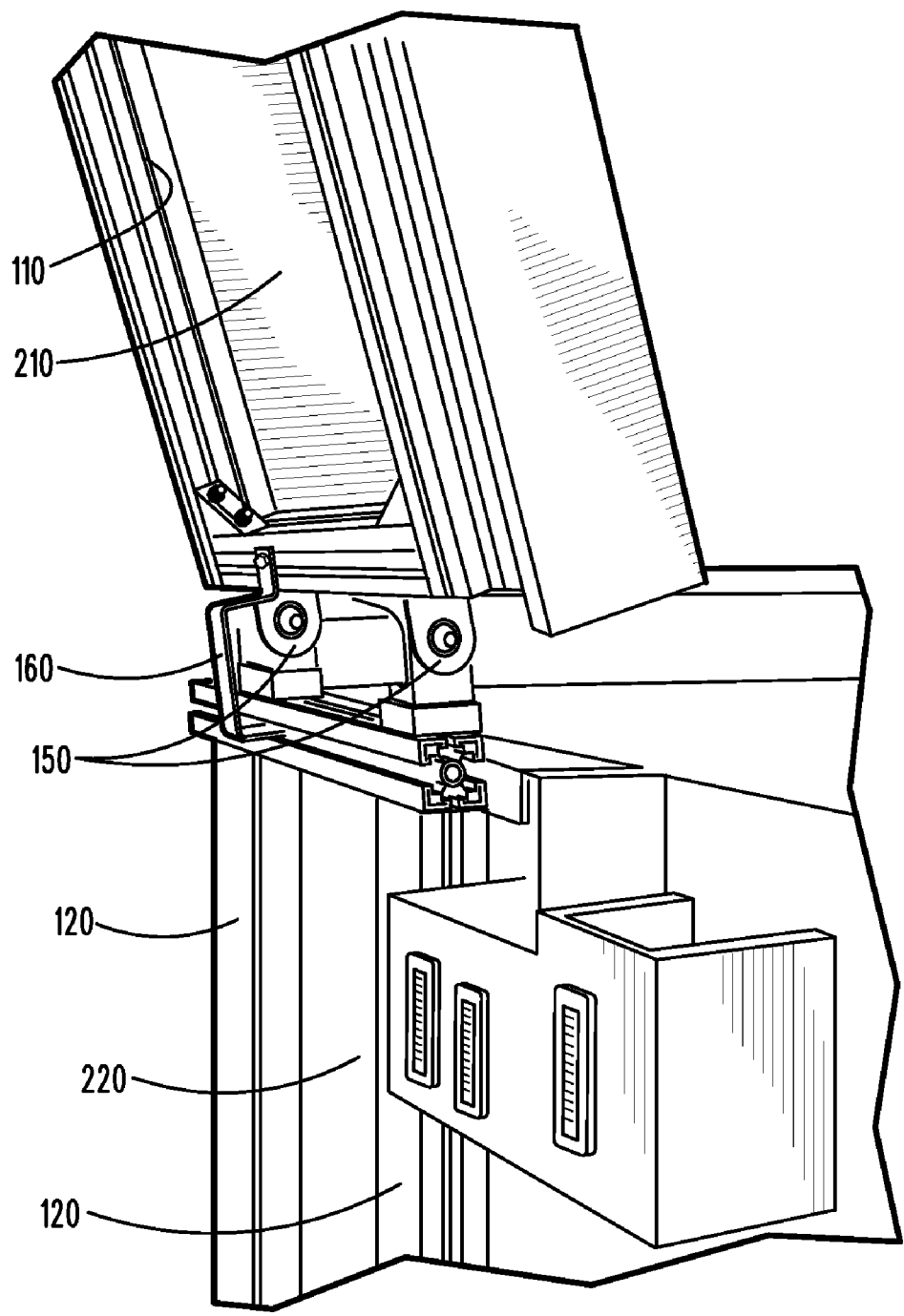
FIG. 3 is a partial view of an embodiment of the invention.

FIG. 3 is a close up view of the embodiment shown in FIG. 2. As can be seen in FIG. 3, top frame 110 is attached to left frame 120 by a pair of hinges 150 such that top frame 110 (and the attached cabinet top 210) can be pivoted to an open position. A latch 160 is provided to hold top frame 110 in the open position. Alternatively, hinges could be provided on rear frame 140 to attach top frame 110 to rear frame 140, or on right frame 130 to attach top frame 110 to right frame 130. The hinged connection allow easy access to test piece 10 for removal, adjustment or maintenance.

Figure 4:
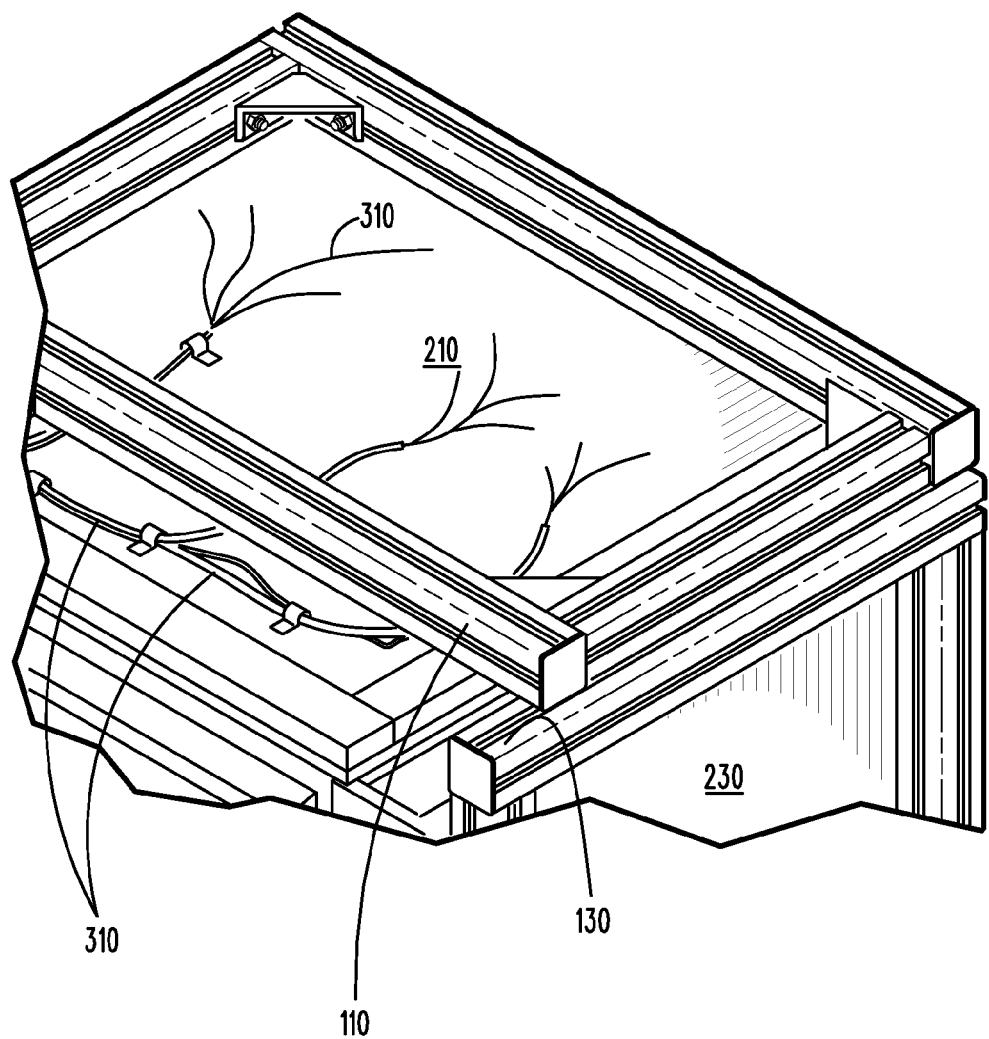
FIG. 4 is a partial view of an embodiment of the invention.

FIG. 4 shows top frame 110, cabinet top 210, and top cabinet sensor wires 310 in more detail. Also shown in FIG. 4 is right frame 130. In this example, top frame 110 is not directly attached to right frame 130. The sturdy connection between top frame 110 and left frame 120, in combination with the weight of top frame 110 and cabinet top 210, keeps cabinet top 210 in the proper position relative to right frame 130 and test piece 10. In other embodiments, a latch or other connection piece can be provided to attach top frame 110 to right frame 130.

Figure 5:
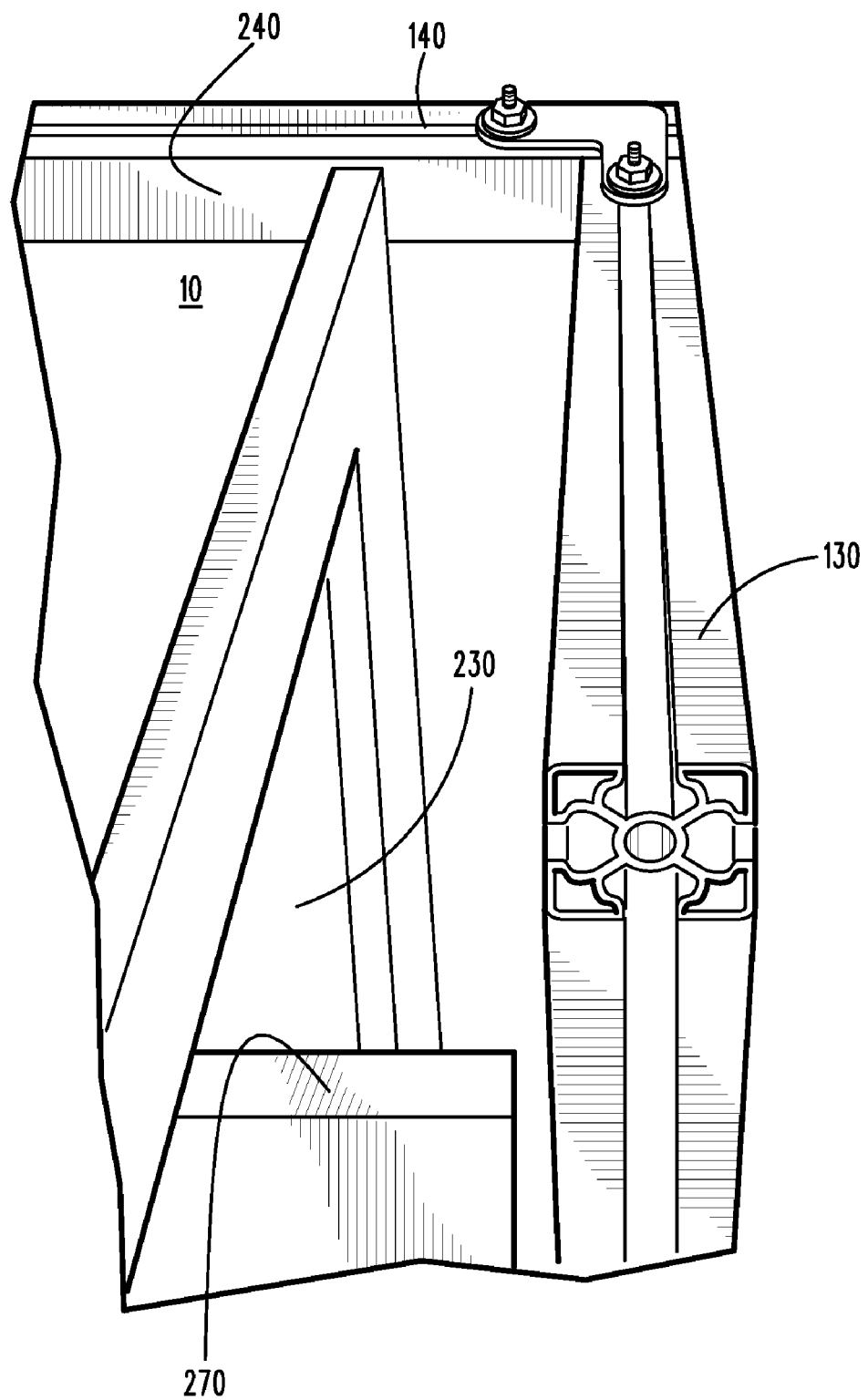
FIG. 5 is a partial view of an embodiment of the invention.

FIG. 5 shows a close-up view of right frame 130 and right cabinet wall 230. FIG. 5 shows right cabinet wall 230 in one of a plurality of positions in which right cabinet wall 230 can be located in order to adapt the invention for use with ovens having different widths. As can be seen, right frame 130 is fixed relative to rear frame 140 by an L-shaped bracket. The position of right cabinet wall 230 is adjustable relative to right frame 130. In the position shown in FIG. 5, right cabinet wall 230 is located next to a test piece 10 having, for example, a width of 27 inches. Right cabinet wall 230 can be positioned up against right frame 130 to accommodate a test piece having, for example, a width of 30 inches. A spacer 270 can be provided to assist in the location of right cabinet wall 230 when testing a test piece having a width less than the maximum width that can be accommodated by support structure 100.

By providing the adjustability of, for example, right cabinet wall 230, the invention allows simple and quick adjustment of the enclosure to accommodate test pieces of different sizes (in this case, widths) without subjecting, in this case, right cabinet wall 230 to repeated fastening and unfastening and the associated deterioration. Other embodiments of the invention can provide adjustability in depth.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the invention.

What is claimed is:

1. A framework for positioning a heat testing cabinet that tests the amount of heat transferred from a cooking appliance, the framework comprising:
   a base for supporting the appliance;
   a first side frame attached to the base;
   a rear frame attached to the base;
   a second side frame attached to the base and located opposite to the first side frame; and
   a top frame attached to the first side frame,
   wherein the first side frame, the rear frame, the second side frame, and the top frame are adapted to hold panels of the heat testing cabinet in a predetermined position relative to the appliance,
   the framework is adapted to hold a side panel of the panels of the heat testing cabinet in a plurality of different positions, and
   the framework is for positioning panels of the heat testing cabinet that have temperature sensors for measuring the amount of heat transferred from the cooking appliance.

2. The framework of claim 1, further comprising a hinge that pivotably attaches the top frame to the first side frame or to the rear frame.

3. The framework of claim 2, further comprising a latch fixed to one of the top frame, the first side frame, or the rear frame,
   the latch being removable attachable to another of the top frame, the first side frame, or the rear frame to hold the top frame in an open position.

4. The framework of claim 1, wherein the plurality of different positions correspond to different standard widths of cooking appliances that are for installing in a furniture recess in a kitchen.

5. The framework of claim 1, wherein the plurality of different positions correspond to different standard widths of cooking appliances that are for installing in a furniture recess in a kitchen.

6. The framework of claim 5, further comprising a hinge that pivotably attaches the top frame to the first side frame or to the rear frame.

7. The framework of claim 6, further comprising a latch fixed to one of the top frame, the first side frame, or the rear frame.

8. An apparatus for testing a cooking appliance, the apparatus comprising:
   a base for supporting the cooking appliance;
   a first side frame attached to the base;
   a rear frame attached to the base;
   a second side frame attached to the base and located opposite to the first side frame;
   a top frame attached to the first side frame;
   a first side panel attached to the first side frame;
   a rear panel attached to the rear frame;
   a top panel attached to the top frame; and
   a second side panel positioned opposite to the first side panel,
   wherein the second side panel is positionable in a plurality of different positions,
   the panels form a heat testing cabinet that enclose a space for receiving the cooking appliance,
   the heat testing cabinet tests the amount of heat transferred from the cooking appliance, and
   the panels of the heat testing cabinet have temperature sensors for measuring the amount of heat transferred from the cooking appliance.

9. The apparatus of claim 8, further comprising a hinge that pivotably attaches the top frame to the first side frame or to the rear frame.

10. The apparatus of claim 9, further comprising a latch fixed to one of the top frame, the first side frame, or the rear frame, the latch being removable attachable to another of the top frame, the first side frame, or the rear frame to hold the top frame in an open position.

11. The apparatus of claim 8, wherein the plurality of different positions correspond to different standard widths of cooking appliances that are for installing in a furniture recess in a kitchen.

12. The apparatus of claim 8, wherein the plurality of different positions correspond to different standard widths of cooking appliances that are for installing in a furniture recess in a kitchen.

13. The apparatus of claim 12, further comprising a hinge that pivotably attaches the top frame to the first side frame or to the rear frame.

14. The apparatus of claim 13, further comprising a latch fixed to one of the top frame, the first side frame, or the rear frame, the latch being removable attachable to another of the top frame, the first side frame, or the rear frame to hold the top frame in an open position.

15. The apparatus of claim 14, wherein the frames maintain the position of the panels such that the panels are at right angles to each other.

16. The apparatus of claim 8, wherein the frames maintain the position of the panels such that the panels are at right angles to each other.

* * * * *